Figure 2:
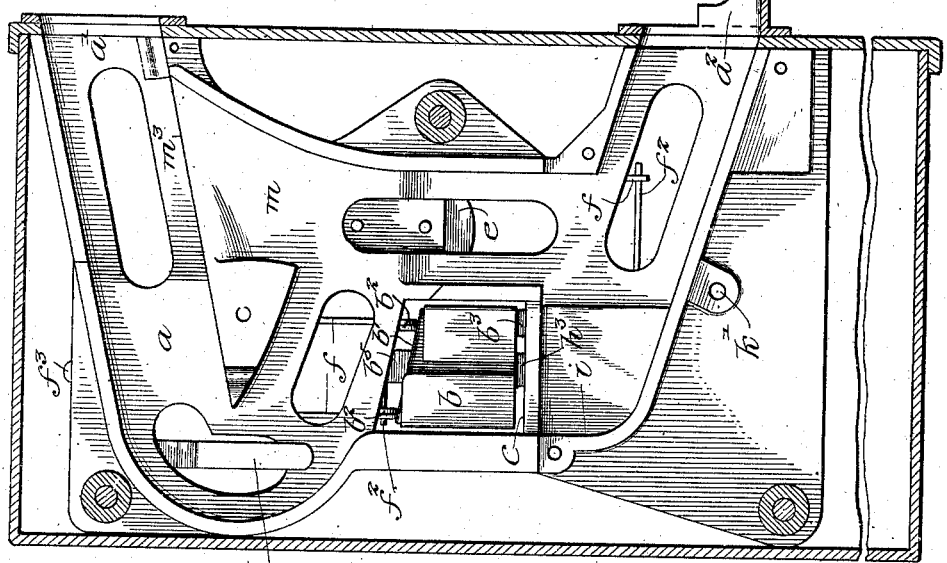

No. 846,604. PATENTED MAR. 12, 1907.
P. E. OSWALD.
TOLL BOX.
APPLICATION FILED MAR. 7, 1905.

5 SHEETS—SHEET 1.

Witnesses:
Edw. P. Barrett
Louis H. Whitehead

Inventor
Paul E. Oswald,
By Barton & Tanner
Attys

No. 846,604. PATENTED MAR. 12, 1907.
P. E. OSWALD.
TOLL BOX.
APPLICATION FILED MAR. 7, 1905.
5 SHEETS—SHEET 2.
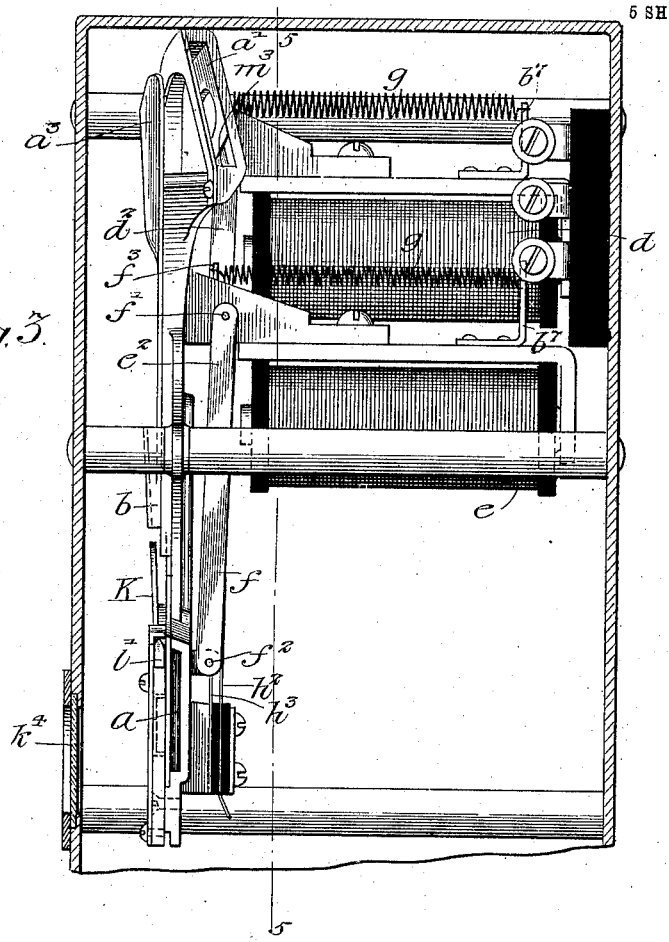
Fig. 3.
Fig. 4.
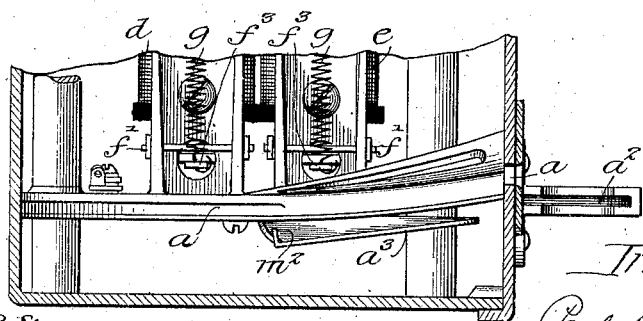
Witnesses:
Edw. Barrett
Louis M. T. Whitehead
Inventor
Paul E. Oswald
By Barton & Tanner
Attys.

No. 846,604. PATENTED MAR. 12, 1907.
P. E. OSWALD.
TOLL BOX.
APPLICATION FILED MAR. 7, 1905.

5 SHEETS—SHEET 3.

Witnesses
Edw. Barrett
Louis M. Whitehead

Inventor
Paul E. Oswald
By Barton & Tanner
Atty's.

No. 846,604.　　　　　　　　　　　　　　PATENTED MAR. 12, 1907.
P. E. OSWALD.
TOLL BOX.
APPLICATION FILED MAR. 7, 1905.
5 SHEETS—SHEET 4.
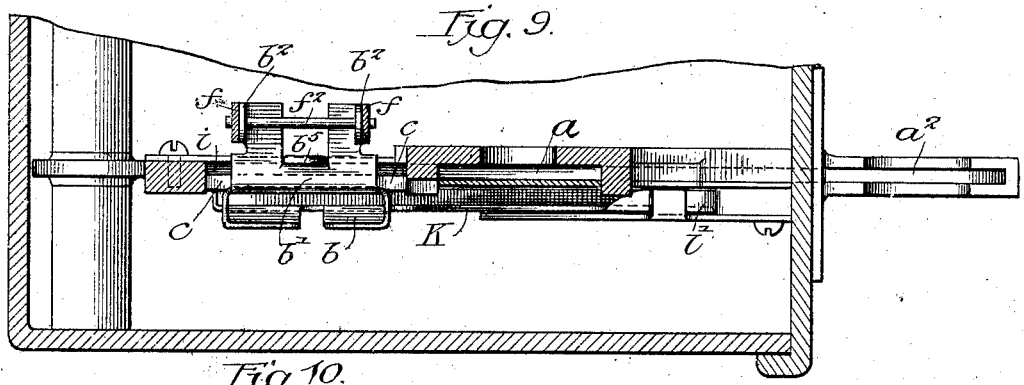
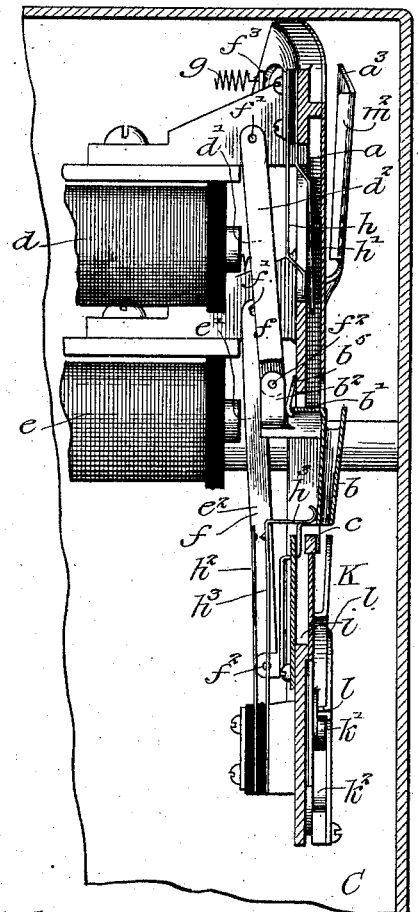
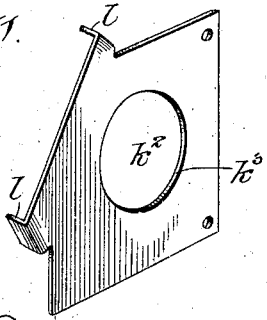
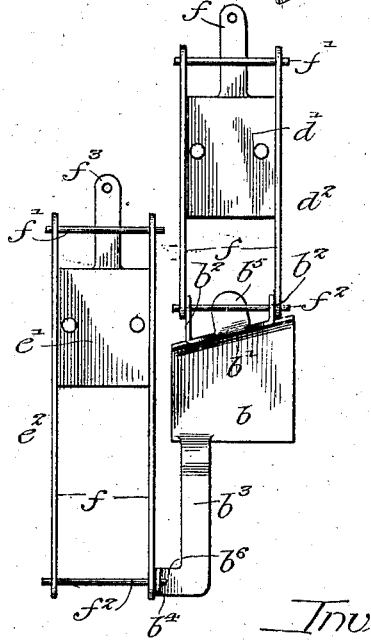
Witnesses:
Edw. P. Barrett
Louis W. F. Whitehead
Inventor
Paul E. Oswald
By Barton & Tanner
Attys No. 846,604. PATENTED MAR. 12, 1907.
P. E. OSWALD.
TOLL BOX.
APPLICATION FILED MAR. 7, 1905.

5 SHEETS—SHEET 5.

Witnesses
Edw. Barritt
Louis M. Whitehead

Inventor
Paul E. Oswald
By Barton & Tanner
Attys.

UNITED STATES PATENT OFFICE.

PAUL E. OSWALD, OF LOS ANGELES, CALIFORNIA, ASSIGNOR TO WESTERN ELECTRIC COMPANY, OF CHICAGO, ILLINOIS, A CORPORATION OF ILLINOIS.

TOLL-BOX.

No. 846,604.　　　　　Specification of Letters Patent.　　　　　Patented March 12, 1907.

Application filed March 7, 1905. Serial No. 248,908.

*To all whom it may concern:*

Be it known that I, PAUL E. OSWALD, a citizen of the United States, residing at Los Angeles, in the county of Los Angeles and State of California, have invented a certain new and useful Improvement in Toll-Boxes, of which the following is a full, clear, concise, and exact description.

My invention relates to a toll-box or coin-collector; and its object is to provide an improved device which will be especially adapted for use at a subscriber's station of a telephone-exchange, the invention being directed more particularly toward an improvement of the mechanism for effecting a proper disposition of the coin under the different conditions which arise in practice.

In the device of my invention a coin-passage is provided leading through the box to a return-cup on the outside, with electrically-controlled mechanism for diverting the coin in the course of its passage if the apparatus and circuits are in order and determining its subsequent disposition.

One feature of my invention is concerned with the means for diverting the coin in its passage. I provide a by-path leading from the coin-passage with a gate which normally closes this by-path, but which is intended to be opened by electromagnetic mechanism controlled by contacts closed in the initial deposit of the coin, so that when said mechanism is actuated (as in the normal operation) the by-path will be opened to divert the coin into a temporary receptacle, in which it is held pending its final disposition. The temporary receptacle normally is in a position to discharge any coin that may be directed into it into the cash-box associated with the collector; but the mechanism which operates to direct the coin into the receptacle also operates to close the receptacle and retain the coin therein. If the outcome of the call for connection is such that the coin is to be collected, the mechanism is merely permitted to return to its normal condition, when the coin is thrown into the cash-box without the necessity of any special act on the part of the operator to bring about that result. If for any reason the connection cannot be obtained through the agency of mechanism provided for that purpose, the parts are moved to release the coin from the temporary receptacle and direct it into a return-chute leading to a refund-tray, whence it may be taken by the depositor. It will be seen that the coin-collector of my invention in being arranged to bring about the deposit of the coin in the cash-box when the connection is successful by the mere return of the parts to their normal condition and in requiring a special movement of the mechanism only in the case of an unsuccessful call is particularly adapted to take care of the ordinary toll service, in which a large percentage of the calls is successful, in a manner that imposes a minimum of work upon the operator.

In the preferred form of my invention the temporary receptacle is movable and constitutes a coin-distributer into which the coin is diverted from the chute through the by-path, the gate which forms a portion of the wall of the chute to normally close said by-path being formed by a ledge or flange at the upper edge of said distributer. Movement of the distributer may be effected by either or both of two electromagnets, the armatures of which are connected to said distributer. Preferably the distributer is suspended from between the armature-levers of the two magnets, one connected near the top and the other near the bottom. By this arrangement the distributer may be given different positions, according as one or the other, or both, of said armatures is attracted.

My invention further contemplates certain details of construction hereinafter to be set forth by reference to the specific structure shown in the drawings, wherein—

Figure 1:
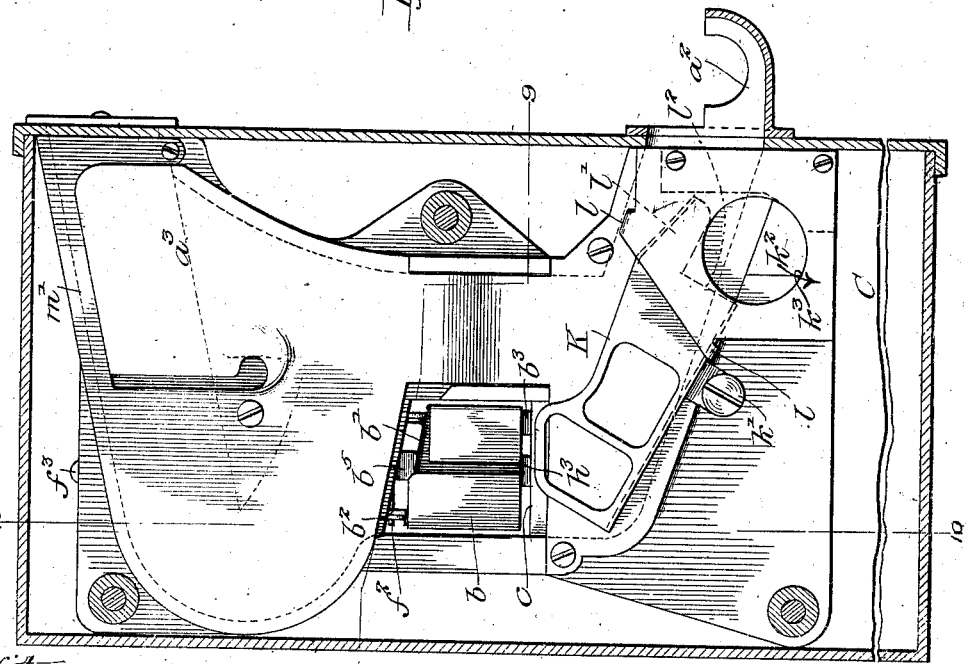
Figures 5, 6, 7, 8:
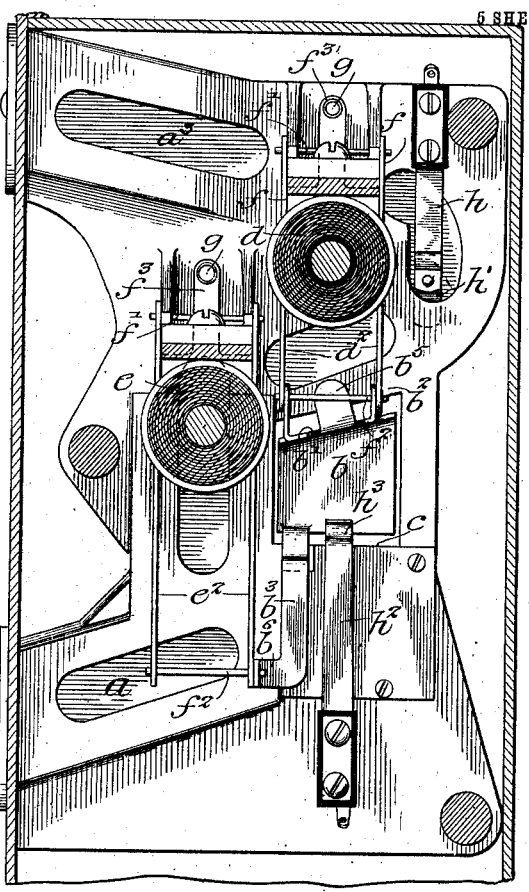
Figure 13:
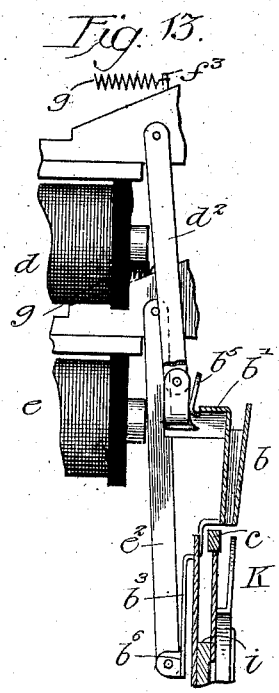
Figure 14:
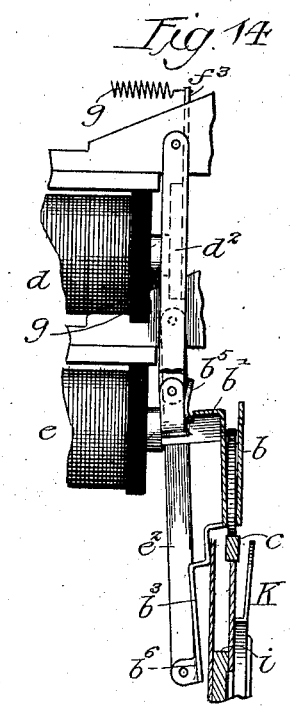
Figure 15:
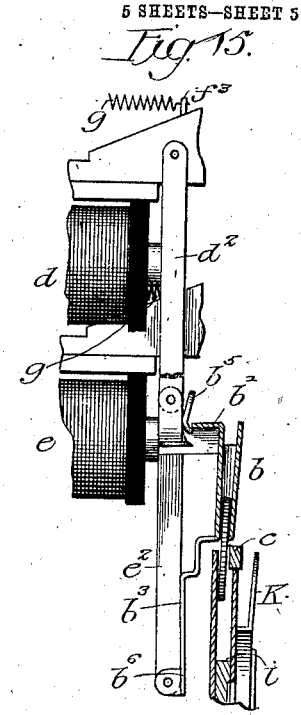
Figure 16:
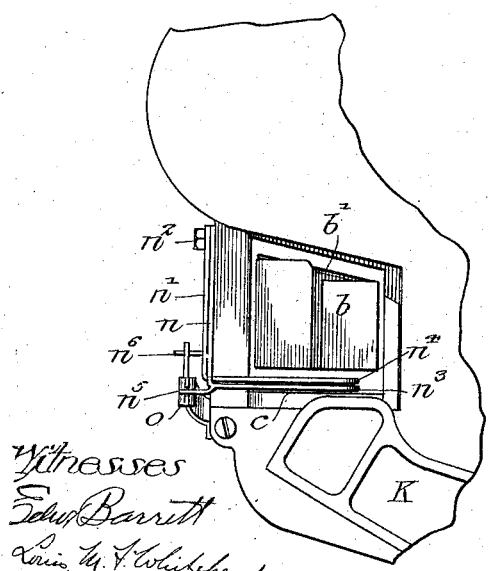
Figure 17:
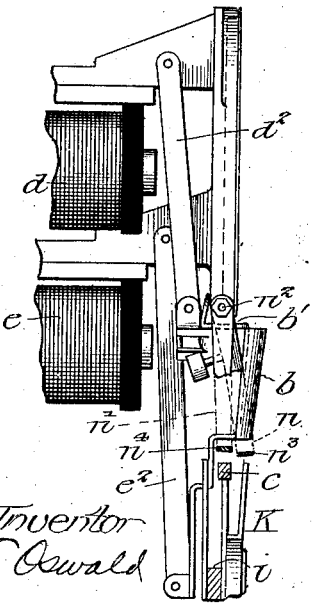

Figure 1 is a front elevation of the mechanism of the toll-box with the case of the box in section. Fig. 2 is a similar view, but with the plate forming the front wall of the several chutes removed. Fig. 3 is a side elevation of the mechanism of the box. Fig. 4 is a partial plan view thereof. Fig. 5 is a sectional view on line 5 5 of Fig. 3. Figs. 6 and 7 and 8 are detail views of parts of the apparatus of the box. Fig. 9 is a cross-sectional view on line 9 9 of Fig. 1. Fig. 10 is a vertical sectional view on line 10 10 of Fig. 1. Fig. 11 is a detail view of a portion of the holder in which a deposited coin is maintained in position to be seen from the outside of the box until the coin is subsequently deposited. Fig. 12 is a skeleton view of the distributing device and the levers for moving it into its successive positions. Figs. 13, 14, and 15 are side elevations, partially in section, looking from the left of Fig. 1, showing the different positions of the coin-distributing device; and Figs. 16 and 17 are partial front and side elevations, respectively, of a modified form of my invention.

The same letters of reference are used to designate the same parts wherever they are shown.

Referring first to Figs. 1 to 15, inclusive, the coin-chute $a$ leads from an opening $a'$ in the side of the toll-box near the top through the box to a refund tray or cup $a^2$, so that if for any reason the apparatus of the box is deranged or the telephone-line with which it may be associated is out of order the coin will pass clear through the box and be refunded to the depositor. A coin-distributer $b$ is provided in association with the chute $a$, said distributer having a projecting flange or lip $b'$, which normally forms a gate for an opening in the floor of the coin-chute $a$, forming a by-path from said chute into the distributer $b$. The coin-distributer $b$ is adapted when advanced to its intermediate position to move the gate or flange $b'$ away from the chute and to register with the opening thus made, so that a coin rolling down the chute instead of passing on to the return-chute will drop into the distributer $b$, where it will rest upon a ledge or gate $c$, formed by the frame of the coin-collector. The coin-distributer is preferably so proportioned that when in its intermediate position and supporting a coin of proper size to operate the device the top of said coin serves to close the opening made in the chute $a$ by the displacement of the flange $b'$, so that coins which may be subsequently deposited before the final disposition of the first-mentioned coin will roll over the top of the coin held in the distributer and pass on through the box to the return-cup $a^2$.

A pair of electromagnets $d$ $e$ is provided, the armatures $d'$ $e'$ whereof are adapted to move levers $d^2$ $e^2$, respectively, pivoted at their upper ends to portions of the framework, and whose lower or free ends are connected to opposite extremities of the coin-distributer $b$. Each of said levers is preferably formed of two links $ff$, united by upper and lower cross-pins $f'$ $f^2$, respectively. The upper cross-pins pass through lugs carried by the framework and serve as fulcrums for the levers. The lower cross-pin $f^2$ of lever $d^2$ passes through ears $b^2$ $b^2$, struck up from the flange $b'$ of the distributer $b$. An arm $b^3$ is carried by the lower portion of the coin-distributer $b$ and is provided with an ear $b^4$, through which the lower cross-pin $f^2$ of the lever $e^2$ passes. The armatures $d'$ $e'$ are secured between the links $ff$ of levers $d^2$ $e^2$, respectively, between the connection of said levers with the coin-distributer and their fulcrums, so that when attracted by the energization of their magnets said armatures may move the levers and operate the coin-distributing device.

Each of the armatures preferably carries an upwardly-projecting arm $f^3$, which is connected by a spring $g$ with a lug $b^7$ at the rear of the framework, so that the said armatures are normally held retracted and the levers and coin-distributer maintained normally in the position shown in Figs. 10 and 13, the outward movement of the levers and distributer being limited by a lug $b^5$, carried by the flange of the distributer, which engages the outer wall of the chute $a$, and also by a portion $b^6$ of the arm $b^3$, which projects from the lower part of the coin-distributer. The coin-distributer in its normal position may open into the cash-box, and when the lever $d^2$ is moved by the attraction of the armature $d'$ of the magnet $d$ the distributer is advanced into an intermediate position, whereupon the flange $b'$ is moved away from the chute to open the same and the distributer is caused to register with such opening, so that the coin is diverted from the main chute and passes into the distributer $b$, where it rests upon the ledge $c$, as shown in Fig. 14. The coin before it reaches the distributer is adapted to close contacts $h$ $h'$, interposed within the main chute, which may be arranged to complete a circuit for the magnet $d$ to advance the coin-distributer and intercept the coin. The circuit may be formed by the limbs of a telephone-line extending from a substation at which the toll device is located to the poles of a central-office battery. A pair of "holdover" contacts $h^2$ $h^3$ is arranged to be closed when the distributer is moved to such intermediate position, which contacts may serve to maintain the magnet $d$ energized independent of the contacts $h$ $h'$. If now the lever $d^2$ is allowed to return to its normal position by the deënergization of magnet $d$, the coin-distributer $b$ is moved to throw the coin into the cash-box; but if the lever $e^2$ is moved by the attraction of armature $e'$ of magnet $e$ the distributer is advanced from its aforesaid intermediate position to register with a return-chute $i$, which may open into the main chute near the refund-tray, so that a coin in the distributer is returned to the outside of the box. The condition of the apparatus at this state is indicated in Fig. 15. It is apparent, therefore, that the relative position of the gate or ledge $c$ to the passage $b$ in opening or closing said passage, is electromagnetically controlled.

A circuit for the magnet $e$ may be arranged to be completed by the central-office operator in any suitable way in case a desired connection cannot be completed, it being understood, of course, that the magnet $d$ must remain energized in order to permit the refund of the coin by the energization of magnet $e$.

Instead of permitting the coin-distributer $b$ to open directly into the cash-box I prefer to provide a tilting chute K, pivoted at $k'$, which leads to a temporary coin-holder $k^2$, having an opening $k^3$, through which a coin held therein may be seen though a suitable window in the cover of the box. The holder $k^2$ is provided with stops $l\ l$ to limit the movement of the tilting chute K. Said chute has a finger $l'$, projecting into the holder, and a coin which passes from the chute into the holder is held therein by said finger and the end $l^2$ of the chute. When a coin subsequently falls from the distributer $b$ into the chute K, said chute is rocked on its pivot $k'$ and the end $l^2$ and finger $l'$ are lifted from engagement with the coin in the holder, whereupon said coin passes out of the holder in the direction of the arrow, Fig. 1, and into the cash-box C.

The upper portion of the chute $a$ at the top is preferably laterally inclined, as shown more clearly in Fig. 4, and the side of said chute $a$ near the top is cut away to form an opening from said main chute into a chute $m$, Fig. 2, communicating with the main chute near the refund-tray, the portion $a^3$ of the wall being bent out to form a guide adapted to direct an undersized coin passing out through said opening into the chute $m$. The top of the chute $a$ at said opening has a downwardly-projecting guide or flange $m'$, and a stop $m^2$ is formed by an inwardly-projecting part of the bent portion $a^3$. A coin of the proper size when inserted in the chute will pass by said opening and proceed into the interior of the box, its upper surface being engaged and held in place by the flange $m$; but a coin of less than the proper size on reaching said opening will not be held by the flange, but will roll off the ledge $m^3$ of the chute, strike the stop $m^2$, and be deflected by the guide $a^3$ into the chute $m$, from whence it will pass into the refund-tray $a^2$.

The feature just described forms no part of the present invention, but constitutes the subject-matter of a divisional application, Serial No. 316,692, filed May 14, 1906.

Referring now to Figs. 16 and 17, I will describe a slightly-modified form of my invention. In addition to the apparatus hereinbefore described I employ two arms $n\ n'$, pivoted at $n^2$ to the side of the framework, said arms carrying right-angled projections or fingers $n^3\ n^4$, respectively, extending underneath the distributer $b$, the finger $n^4$ of lever $n'$ lying on the rear side of the distributer when the same is in its normal position. The arms $n\ n'$ carry pins $n^5\ n^6$, which engage opposite sides of a stop-arm $o$, carried by the frame, the arm $n$ preferably being weighted, as indicated.

When the coin-collector is employed in connection with common battery telephone systems, the closure of contacts $h\ h'$ may complete a circuit for the magnet $d$, including the central-office battery, as before indicated, which circuit should be maintained until the coin is to be refunded or deposited. In some modern systems with which the coin-collector herein shown is capable of application when the operator's plug is inserted in an answering-jack of a line in response to a call from the substation of said line the current is interrupted for an instant, due to the operation of the cut-off relay, and the circuit again renewed from the battery in the cord-circuit. With such a condition it will be seen that the magnet $d$ might release its armature at the instant the circuit was broken during the insertion of the operator's plug, and so deposit the coin in the cash-box before the proper time. The construction shown in Figs. 16 and 17 and described above is adapted to overcome this difficulty, and its operation is as follows: When the coin-distributer $b$ is moved into its intermediate position upon the energization of the magnet $d$, the coin passing through the main chute is diverted into the distributer $b$ and rests upon the finger $n^4$ of arm $n'$. An instant later when the operator at the central office answers the call by plugging into the answering-jack of the line with which the toll device is associated the current in the line is momentarily interrupted and the magnet $d$ becomes deënergized, whereupon the lever $d^2$ moves under the influence of spring $g$ to return the distributer $b$ to its normal position, and the coin now steps onto the finger $n^3$ of the arm $n$ instead of falling into the cash-box. An instant later when the current in the line is again established the distributer is moved back to its intermediate position by the magnet $d$, and the coin now steps from the finger $n^3$ onto the ledge $c$, pushing the finger $n^4$ out of its path, since said finger lies in a plane a little above that of the finger $n^3$. The coin is now in position to push either finger before it, since its base now lies below both of said fingers, and said coin may be transferred either into the cash box or refund-chute, according as the distributer is shifted.

I claim—

1. In a toll-box, the combination with a coin-chute leading through the box to a refund-tray, said chute normally providing an unobstructed path for a proper-sized operating coin, of a coin-distributing device, a normally closed by-path leading from the coin-chute to said distributing device, magnetically-actuated mechanism adapted to open said by-path, contacts closed by a coin in said chute, alternative channels leading from said distributing device, one of said channels opening into a cash-box, the other channel leading to a refund-tray, and magnetically-actuated mechanism adapted to move said distributing device to divert a coin held therein into either of the aforesaid channels.

2. In a toll-box, the combination with a coin-chute leading through the box, of a movable coin-distributing device capable of a number of positions, said distributing device in one position intercepting and receiving a coin passing through said chute, contacts operated by a coin in the chute, a cash-box passage, said coin-distributing device registering therewith in another position, a return-passage with which said distributing device registers in its third position, and electromagnetic mechanism adapted to effect the movement of said distributing device into such positions.

3. In a toll-box, the combination with a chute leading through the box having a normally closed passage leading therefrom, of a magnet, a coin-distributing device, means controlled by said magnet for opening said passage in said chute and advancing said distributing device into an intermediate position to register with said passage, contacts operated by a coin in said chute, an electromagnetic means for moving said distributing device another step, a coin-receptacle on each side of said distributer when in its intermediate position, said distributer registering with one of said receptacles when released from its intermediate position and with the other of said receptacles when advanced from its intermediate position by said last-mentioned magnet.

4. In a toll-box, the combination with a chute leading through the box, of a magnet, a coin-distributing device, a movable part forming a portion of the wall of said chute, means controlled by said magnet for moving said part and simultaneously moving said coin-distributing device into an intermediate position to register with the opening thus made in the chute; whereby a coin passing through the chute is diverted into said coin-distributing device, contacts operated by a coin in said chute, a cash-box, means for operating said coin-distributing device to tranfer a coin held therein into said cash-box when said device is released from said intermediate position, a return-chute, and electromagnetic means adapted to move said coin-distributing device from its intermediate position and throw a coin held therein into said return-chute.

5. In a toll-box, the combination with a chute leading through the box, of a magnet, a coin-distributing device, a portion of said device normally forming a part of said chute, means controlled by said magnet for moving said device into an intermediate position to displace said portion and cause said distributing device to register with the opening thus made to intercept and receive a coin passing through the box, contacts operated by a coin in the chute, a ledge adapted to support a coin in said distributing device when the same is in its intermediate position, a cash-box, means for moving said distributing device when released from its intermediate position to register with said cash-box, a return-chute, a magnet, and means controlled thereby for moving said distributing device from its intermediate position to register with said return-chute.

6. In a toll-box, the combination with a chute leading through the box to a refund-tray, of a magnet, a coin-distributing device, a projection of said device normally completing said chute, means controlled by said magnet for moving said device into an intermediate position, to displace said projection and cause the distributing device to register with the opening thus made to receive a coin passing through the chute, contacts operated by the coin in the chute, hold-over contacts operated in the movement of said distributing device into such intermediate position, a ledge below the distributer adapted to support a coin therein when the said distributing device is in such intermediate position, a cash-box, means for causing said distributing device to register with said box when said device is released from such intermediate position, a return-chute opening into the main chute near the refund-tray, a magnet, and means controlled thereby for moving said distributing device from its intermediate position to register with said return-chute.

7. In a toll-box, the combination with a coin-chute leading through the box, of a coin-distributing device having a portion forming a part of said chute, a pair of electromagnets, pivoted levers adapted to be moved by the armatures of said electromagnets, the free end of one lever being connected with the upper portion of said distributing device and the free end of the other lever being connected with the lower portion thereof; whereby said coin-distributing device may be given different positions, said first-mentioned lever being adapted to move said distributing device to a position to open a by-path from the main chute into said distributing device to intercept a coin passing through the chute, contacts operated by a coin in the coin-chute, a cash-box, means for moving said distributing device when released from its intermediate position to register with said cash-box, and a return-chute, said second-mentioned lever being adapted to move said distributing device from its intermediate position to register with said return-chute.

8. In a toll-box, the combination with a chute leading through the box, of a magnet, a coin-distributing device, a movable part forming a portion of said chute, means controlled by said magnet for displacing said movable part and advancing said coin-distributing device into an intermediate position to register with the opening thus made in the chute, whereby a coin passing through the chute is diverted into said coin-distributer, the coin-distributer being so proportioned to the size of the coin held therein that said coin will close the aforesaid opening made in said chute, whereby coins subsequently deposited before the coin in said distributing device is disposed of, will pass on through the box and be refunded to the depositor, contacts operated by a coin in said chute, a cash-box, means for moving said coin-distributing device to register therewith when said device is released from said intermediate position, a return-chute, and a magnet adapted to move said coin-distributing device from its intermediate position to register with said return-chute.

9. In a toll-box, the combination with a coin-chute leading through the box to a refund-tray, said chute normally providing an unobstructed path for the proper-sized operating-coin of a cash-box, a coin-distributer adapted to intercept and receive a coin passing through the chute, and electromagnetically-operated mechanism for moving said coin-distributer to transfer said coin into the cash-box or into said coin-chute.

10. In a toll-box, the combination with a coin-chute leading through the box, said chute normally providing an unobstructed path for a proper-sized operating-coin therein, of a coin-distributer, an electromagnet, an armature therefor adapted when attracted to move one end of said distributer, said distributer when in such position being adapted to intercept and receive a coin passing through the chute, a passage with which said distributer registers when released, a second electromagnet, an armature therefor adapted when attracted to move the opposite end of said distributer, and a second passage with which said distributer registers when so moved by said last-mentioned magnet.

11. In a toll-box, the combination with a laterally-movable coin-distributer having an opening in the bottom thereof through which a coin may pass, of a movable stop normally registering with the discharge-opening of said distributer to support a coin therein, a support below the plane of said movable stop, means for moving said distributer to an alternative position to register with said support, said distributer being adapted in such movement to transfer a coin held therein to said support, and means for imparting a return movement to said distributer, said stop being adapted to be engaged by the coin and moved aside in such return movement to permit the release of the coin upon a complete oscillation of the distributer.

12. In a toll-box, the combination with a laterally-movable coin-distributer having an open bottom, of means for giving said distributer alternative positions, and a series of laterally-movable steps in vertical rows registering with the respective positions of said distributer adapted to support a coin therein, the steps on each row being staggered relatively to the steps on the other row, whereby in the initial movement of the distributer the coin is shifted from the step in one row to a lower step in the other row, and in a subsequent return movement the coin engages the first step and moves it aside, the coin being finally released by the oscillation of the distributer sufficiently to shift the coin from the last step of the series.

13. In a toll-box, the combination with a coin-chute leading through the box, of a movable part forming a portion of the wall of said chute, a coin-distributer, electromagnetic means adapted when energized to displace said part and move the distributer into an intermediate position to register with the opening thereby made in said chute; whereby a coin passing through the box is diverted into said distributer, contacts actuated by a coin in the chute, a pivoted arm, a finger carried thereby lying below the distributer and adapted to support a coin therein when the same is in its intermediate position, a stop adapted to limit the movement of said arm, a second pivoted arm having a finger below the distributer in a plane below the first-mentioned finger, the movement of said arm being limited by said stop, means for operating the distributer when released by the deënergization of said magnet to throw the coin upon the finger of said arm, a ledge below both fingers onto which said coin steps when said electromagnetic means are again operated and said distributer assumes its intermediate position, the coin in such movement of the distributer pushing away the finger in front thereof, a cash-box, said distributer when again released being operated to deposit a coin therein, a return-chute, and electromagnetic means adapted to move the distributer from its intermediate position to throw a coin held therein into said return-chute, the coin on the ledge in either movement of said distributer pushing away the finger in front thereof.

14. In a toll-box, the combination with a cash-box and a refund-tray, of a coin-chute leading through the toll-box to said refund-tray, a temporary coin-receptacle, a by-path leading thereto from said coin-chute, a gate normally closing said by-path, a normally open exit from said temporary receptacle to a chute leading to said cash-box, a second gate arranged to close said exit when said first-mentioned gate is opened, and electromagnetic mechanism adapted to control said gates.

15. In a toll-box, the combination with a cash-box and a refund-tray, of a coin-chute leading through the box and having branches communicating with said cash-box and refund-tray, two gates controlling the branch of said chute leading to the cash-box, one of said gates being located at the entrance to said branch leading to the cash-box and being normally closed, the other of said gates being located in said branch between the first-mentioned gate and the cash-box and being normally open, and electromagnetically-actuated mechanism adapted to control said gates.

16. In a toll-box, the combination with a cash-box and a refund device, of a coin-chute leading through the box, and having two branches, one leading to the refund device, a temporary coin-receptacle to which said other branch leads, alternative passages leading from said temporary receptacle, one to the cash-box and the other to the refund device, a gate arranged to normally close the branch of said coin-chute leading to the temporary receptacle, distributing mechanism adapted to direct the coin upon its release from said temporary receptacle into either of its alternative channels, and electromagnetic mechanism adapted to control said gate and said distributing mechanism.

17. In a toll-box, the combination with a cash-box and a refund device, of a coin-chute leading through the box to the refund device, a temporary coin-receptacle, a channel leading therefrom to said cash-box, said temporary receptacle normally resting in position to deposit a coin held therein in said channel leading to the cash-box, and electromagnetic mechanism adapted to move said temporary receptacle into a position to receive a coin from said coin-chute, whereby the coin is first diverted into the temporary receptacle and then upon return of said receptacle to its normal position is deposited in the cash-box.

18. In a toll-box, the combination with a cash-box and a refund device, and a coin-chute leading through the box to said refund device, of a temporary coin-receptacle, a normally open channel leading therefrom to said cash-box, a by-path leading from said coin-chute to said temporary receptacle, mechanism adapted to open said by-path and close said channel leading from the temporary receptacle to the cash-box, and an electromagnet controlling said mechanism, whereby a coin is first diverted into said temporary receptacle and upon the return movement of the mechanism is deposited in the cash-box.

19. In a toll-box, the combination with a cash-box and a refund device, and a coin-chute leading through the box to said refund device, of a temporary coin-receptacle, alternative channels leading therefrom, one to said cash-box and the other to said refund device, said channel leading to the cash-box being in position to receive a coin released from said temporary receptacle, coin-distributing mechanism adapted to divert a coin released from said receptacle into said channel leading to the refund-tray, a normally closed by-path from said coin-chute to said temporary receptacle, and electromagnetically-actuated mechanism adapted to open said by-path and to control said coin-distributing mechanism.

20. In a coin-collector, the combination with a coin-chute leading through the box to a refund-tray, said chute normally providing an unobstructed path for a proper-sized operating-coin therein, of a cash-box, coin-detaining mechanism adapted to divert a coin from said chute, a magnet for operating said mechanism, coin-refunding mechanism adapted to return a coin released by said detaining mechanism to said coin-chute, and a second magnet for operating said refunding mechanism.

In witness whereof I hereunto subscribe my name this 17th day of February, A. D. 1905.

PAUL E. OSWALD.

Witnesses:
C. M. SEELEY,
T. A. MORLEY.